(12) United States Patent
Alexander et al.

(10) Patent No.: US 9,319,933 B2
(45) Date of Patent: Apr. 19, 2016

(54) INTELLIGENT TRANSPORTATION SYSTEMS DEVICE

(75) Inventors: Paul Dean Alexander, Kent Town (AU); Paul Kingsley Gray, Kent Town (AU)

(73) Assignee: Cohda Wireless Pty. Ltd. (AU)

( * ) Notice: Subject to any disclaimer, the term of this patent is extended or adjusted under 35 U.S.C. 154(b) by 424 days.

(21) Appl. No.: 13/812,677

(22) PCT Filed: Jul. 28, 2011

(86) PCT No.: PCT/AU2011/000951
§ 371 (c)(1),
(2), (4) Date: Sep. 3, 2013

(87) PCT Pub. No.: WO2012/012836
PCT Pub. Date: Feb. 2, 2012

(65) Prior Publication Data
US 2013/0337855 A1 Dec. 19, 2013

(30) Foreign Application Priority Data
Jul. 28, 2010 (AU) .................. 2010903357

(51) Int. Cl.
*H04B 7/00* (2006.01)
*H04B 15/00* (2006.01)
*H04W 28/04* (2009.01)
*H04W 72/08* (2009.01)
*H04W 24/00* (2009.01)
*H04W 72/04* (2009.01)

(52) U.S. Cl.
CPC .......... *H04W 28/044* (2013.01); *H04W 72/082* (2013.01); *H04W 24/00* (2013.01); *H04W 72/04* (2013.01)

(58) Field of Classification Search
USPC .............. 455/501, 63.1, 114.2, 522, 69
See application file for complete search history.

(56) References Cited

U.S. PATENT DOCUMENTS

| 5,877,698 A * | 3/1999 | Kusnier et al. ............ 340/5.92 |
|---|---|---|
| 7,013,145 B1 * | 3/2006 | Centore, III ............... 455/454 |
| 8,228,782 B2 * | 7/2012 | Han et al. ................... 370/204 |
| 2002/0145541 A1 * | 10/2002 | Matsui et al. .............. 340/934 |
| 2003/0151520 A1 | 8/2003 | Kraeling et al. |
| 2004/0028413 A1 * | 2/2004 | Al-Araji et al. ............ 398/141 |
| 2004/0259557 A1 * | 12/2004 | Bey .............................. 455/447 |

(Continued)

OTHER PUBLICATIONS

"International Application No. PCT/AU2011/000951, International Search Report and Written Opinion mailed Oct. 11, 2011", 9 pgs.

(Continued)

*Primary Examiner* — Dominic E Rego
(74) *Attorney, Agent, or Firm* — Schwegman, Lundberg & Woessner, P.A.

(57) ABSTRACT

An Intelligent Transportation Systems (ITS) device is described. The ITS device (400) includes: radio resources including a receiver (402) adapted to receive a radio signal in at least two frequency bands; a channel detector (410) arranged to analyse a signal received in a first frequency band to determine the presence of a transmission in that frequency band; a controller (402) configured to control assignment of radio resources, and in the event that the channel detector detects a signal in the first frequency band, to prevent transmission of a potentially interfering radio signal. The first frequency channel can be part of another radio communications system, such as a RTTT1 SSRC radio system.

22 Claims, 3 Drawing Sheets

(56) References Cited

U.S. PATENT DOCUMENTS

| | | | |
|---|---|---|---|
| 2006/0240814 A1* | 10/2006 | Cutler | 455/423 |
| 2008/0253327 A1* | 10/2008 | Kohvakka et al. | 370/330 |
| 2008/0299925 A1* | 12/2008 | Walley et al. | 455/161.1 |
| 2009/0109936 A1* | 4/2009 | Nagai | 370/336 |
| 2009/0215403 A1* | 8/2009 | Currivan et al. | 455/69 |
| 2009/0312971 A1* | 12/2009 | Lee | 702/77 |
| 2010/0118835 A1* | 5/2010 | Lakkis et al. | 370/336 |
| 2010/0148828 A1* | 6/2010 | Nagatani et al. | 327/105 |
| 2010/0159846 A1* | 6/2010 | Witkowski et al. | 455/70 |
| 2010/0267413 A1* | 10/2010 | Iizuka et al. | 455/522 |
| 2011/0136429 A1* | 6/2011 | Ames et al. | 455/41.1 |
| 2014/0146704 A1* | 5/2014 | Cho | 370/254 |

OTHER PUBLICATIONS

Abbasi, Mahdi, "Characterization of a 5GHz Modular Radio Frontend for WLAN Based on IEEE 802.11p", Master's Thesis in Telecommunication, Department of Technology and Built Environment, University of Gavle, Vienna [retrieved on Oct. 4, 2011 at http://hig.diva-portal.org/smash/get/diva2:132589/FULLTEXT01], (Dec. 2008), 51 pgs.

* cited by examiner

INTELLIGENT TRANSPORTATION SYSTEMS DEVICE

PRIORITY CLAIM TO RELATED APPLICATIONS

This application is a national stage application under 35 U.S.C. §371 of PCT/AU2011/000951, filed Jul. 28, 2011, and published as WO 2012/012836 A1 on Feb. 2, 2012, which claims priority to Australian Application No. 2010903357, filed Jul. 28, 2010, which applications and publication are incorporated by reference as if reproduced herein and made a part hereof in their entirety, and the benefit of priority of each of which is claimed herein.

FIELD OF THE INVENTION

The present invention relates to radio devices enabling the coexistence of wireless communications systems. The illustrative embodiment is presented in the context of an intelligent transportation system.

BACKGROUND OF THE INVENTION

Intelligent Transport Systems (ITS) are systems that sense, gather and communicate data in a transportation setting. The aim of such systems is to aid transportation systems to operate more safely, efficiently or cost effectively, and to aid in the planning and management of transportation systems. Exemplary uses of ITS include traffic flow monitoring, variable tolling, emergency vehicle tracking and deployment and dynamic traffic control, to name a few.

Some components of ITS are affixed to moving vehicles. These devices communicate with each other and/or fixed components of the system wirelessly. ITS typically operate at 5.9 GHz, and may be compliant with draft standards such as ETSI TS 202 663 or IEEE 1609/802.11p for example.

However, one potential issue for deployment of ITS is the requirement of coexistence between the already deployed Road Transport and Traffic Telematics (RTTT) Dedicated Short Range Communication (DSRC) devices and other similar systems and ITS devices.

RTTT-DSRC devices include systems that are used to collect road tolls, such as the system illustrated in FIG. 1. These devices typically operate at 5.8 GHz.

The RTTT-DSRC system of FIG. 1 includes road side equipment (RSE) 102 and one or more RTTT-DSRC devices 104, 104A, such as those carried by vehicles 106, 106A. Typically RTTT-DSRC devices 104 are low power devices capable of running off batteries for long periods. The device 104 operates in a very low power mode listening for signals from road side equipment 102 (e.g. a toll gantry). When the RTTT-DSRC device 104 "hears" a signal it "wakes up" and enters a higher power mode and attempts to execute a transaction with the RSE 102. The wireless connectivity range for RTTT-DSRC devices 104, 104A is typically short, say less than 100 m. The RTTT-DSRC will only operate over the zone 108 in which it is capable of communicating with the RSE 102 as the vehicle 106 moves past it. Thus, in FIG. 1 the RTTT-DSRC device 104 can communicate with the RSE 102, but RTTT-DSRC device 104A is out of range.

On the other hand, ITS devices can have higher transmit powers and may be active continuously. In FIG. 1 each vehicle 106, 106A has an ITS device 110, 110A affixed to them.

FIG. 2 is a schematic block diagram of the ITS device 110. The device 110 has an ITS radio component 204 which is effectively the physical transmitter and receiver of the device 110. Operation of the device 110 is controlled via a manager component 202, and it runs a protocol stack 206. As noted above the device 110 will typically operate on a channel at 5.9 GHz, and will be compliant with draft standards such as ETSI TS 202 663 or IEEE 1609/802.11p for example.

Despite the fact that they operate at slightly different carrier frequencies, interference can result between the systems. Interference has the potential to disrupt communication via the RTTT-DSRC.

It is thus desirable to have ITS devices avoid causing interference around RTTT-DSRC signalling zones. To date several solutions have been proposed for this problem:

The RSE can be fitted with an ITS radio device. This ITS radio device transmits a message, the reception of which by a vehicle's ITS device indicates that the vehicle's receiver is in the vicinity of a RTTT-DSRC zone. The message can include a message type indicating that this message is to be interpreted as transmitted from a RTTT-DSRC location. The vehicle's ITS receiver may then determine that it is in a RTTT-DSRC zone simply because it received a message of this type. The message may also include the position of the gantry. This is helpful if the vehicle's ITS device is position aware, e.g. if it has GPS positioning capabilities or across to GPS data from another source. If the vehicle is told where the RTTT-DSRC zone is and it knows its own location in the same co-ordinate system then it can determine whether or not it is in the RTTT-DSRC zone. The dimensions of the RTTT-DSRC zone can also be included in the message transmitted by the RSE's ITS radio. The message could also include authentication data to validate the message as a countermeasure to spoofing attacks aimed at ITS devices.

The vehicle's ITS device can be provided with means for receiving RTTT-DSRC signals. The ITS device can then receive RTTT-DSRC signals. The reception of the DSRC signal would indicate to the ITS device that it is in the vicinity of a RTTT-DSRC zone. The reception means includes a dedicated hardware subsystem, radio equipment able to receive and decode the DSRC signal. This subsystem is connected to the ITS device management system which can suspend ITS transmission when the RTT DSRC radio system indicates that it is in a RTTT-DSRC zone.

It is an object of the present invention to provide an alternative mechanism to avoid interference between an ITS device and other radio systems such as RTTT-DSRC systems.

Reference to any prior art in the specification is not, and should not be taken as, an acknowledgment or any form of suggestion that this prior art forms part of the common general knowledge in Australia or any other jurisdiction or that this prior art could reasonably be expected to be ascertained, understood and regarded as relevant by a person skilled in the art.

SUMMARY OF THE INVENTION

In a first aspect the present invention provides an Intelligent Transportation Systems (ITS) device including: radio resources including a receiver adapted to receive a radio signal in at least two frequency bands; a channel detector arranged to analyse a signal received in a first frequency band to determine the presence of a transmission in that frequency band; a controller configured to control assignment of radio resources, and in the event that the channel detector detects a signal in the first frequency band, to prevent transmission of a potentially interfering radio signal.

In preferred embodiments the transmissions to be prevented are transmissions from the ITS system in a second frequency band. In some embodiments the first frequency band is a frequency band not used by the ITS for transmission of signals. Preferably it is a frequency band used by a RTTT-DSRC.

The controller can be configured to cause the receiver to be tuned to the first frequency from time to time to enable the channel detector to attempt detection of a transmission in the first frequency band. The controller can further be configured to cause the receiver to be tuned to a second frequency band and to decode a plurality of received channels transmitted on the second frequency band, according to a predetermined access scheme applied to transmissions on the second frequency band.

In the event that the predetermined access scheme applied to transmission on the second frequency band assigns a first transmission of a first type to a first logical channel, and a second transmission of a second type to a second logical channel, the controller can be configured to assign radio resources to the first frequency during at least some periods in which a transmission on the second logical channel of the second frequency band could be received. The predetermined access scheme can include a plurality of second logical channels. In this case the controller can be configured to assign radio resources to the first frequency during at least some periods in which a transmission on one of the second logical channels of the second frequency band could be received.

The channel detector can be arranged to analyse a received signal to detect the presence of a transmission in the first frequency band without decoding the received signal in the first frequency band.

The channel detector can be arranged to analyse a power level of a received signal in the first frequency band, and in the event that the received power level is above a threshold, determine that a transmission in the first frequency band is detected. The channel detector can be arranged to detect a predetermined transmission structure in the first frequency band. The channel detector can be arranged to detect a predetermined modulation scheme in the first frequency band.

The channel detector can include: a time domain correlator for detecting a modulation scheme in the first frequency band; and or a spectral analyser to determine a power level at at least one frequency in the first frequency band.

The ITS device preferably includes shared radio resources that are used for reception of signals on the first and second frequency bands.

In a second aspect the present invention provides a method in a transceiver operating in an Intelligent Transportation System (ITS). The method includes: enabling reception of a radio transmission in at least one ITS frequency band; enabling reception of a radio transmission in at least one first non-ITS frequency band; analysing a signal received in the first non-ITS frequency band to detect the presence of a transmission in that frequency band; and in the event that a signal in the first non-ITS frequency band is detected; preventing transmission of a potentially interfering radio signal, by the transceiver.

The step of, enabling reception of a radio transmission in at least one ITS frequency band can include, tuning a receiver of the transceiver to the ITS frequency band; and the step of, enabling reception of a radio transmission in at least one first non-ITS frequency band includes, tuning the same receiver to the non-ITS frequency band.

The transmissions received on the ITS frequency band can be arranged according to a predetermined access scheme applied, such that the ITS frequency band includes a first logical channel and second logical channel. In this case the method can also include, enabling reception of a radio transmission in at least one of the first non-ITS frequency band during at least some periods in which a transmission on the second logical channel could be received.

The access scheme can include a plurality of second logical channels. In this case the method can include enabling reception of a radio transmission in the first non-ITS frequency band during at least some periods in which a transmission on one of the second logical channels could be received.

The method can also include analysing a received signal in the non-ITS channel to detect the presence of a transmission without decoding the received signal. The step of analysing a signal received in the first non-ITS frequency band to detect the presence of a transmission in that frequency band, can include: analysing a power level of a received signal in the non-ITS frequency band; and in the event that the received power level is above a threshold, determining that a transmission in the non-ITS frequency band is detected. The step of analysing a signal received in the first non-ITS frequency band to detect the presence of a transmission in that frequency band, can include: analysing the received signal to detect a presence or absence of a predetermined transmission structure in the received signal.

The predetermined transmission structure can include a predetermined modulation scheme. The method as may include, conducting time domain correlation to detecting a modulation scheme in the received signal.

The method can also include, conducting spectral analysis of the received signal to determine a power level at, at least one frequency in the non-ITS frequency band.

The step of preventing transmission of a potentially interfering radio signal, by the transceiver includes any one or more of the following:

preventing transmission by the device;

preventing transmission by the device in one or more selected frequency bands;

preventing transmission by the device having a power level above a predetermined power level.

The method can further include, ceasing prohibition of transmissions of a potentially interfering radio signal.

For example the step of ceasing prohibition of transmissions of a potentially interfering radio signal could occur after any one or more of the following criterion are fulfilled:

a predefined time has elapsed;

the transceiver has moved a predefined distance;

a subsequent analysis of a signal received in the first non-ITS frequency band fails to detect the presence of a transmission in that frequency band.

As used herein, except where the context requires otherwise, the term "comprise" and variations of the term, such as "comprising", "comprises" and "comprised", are not intended to exclude further additives, components, integers or steps.

BRIEF DESCRIPTION OF THE DRAWINGS

Embodiments of the present invention will now be described by way of non-limiting example only, with reference to the accompanying drawings. In the drawings.

DETAILED DESCRIPTION OF THE EMBODIMENTS

In broad concept, the preferred embodiments of the present invention re-use radio resources of the ITS radio system to assist in detection of transmission on another radio communications system such as a RTTT-DSRC system. Most preferably this can be performed without decoding the RTTT-DSRC transmissions.

Figure 1:
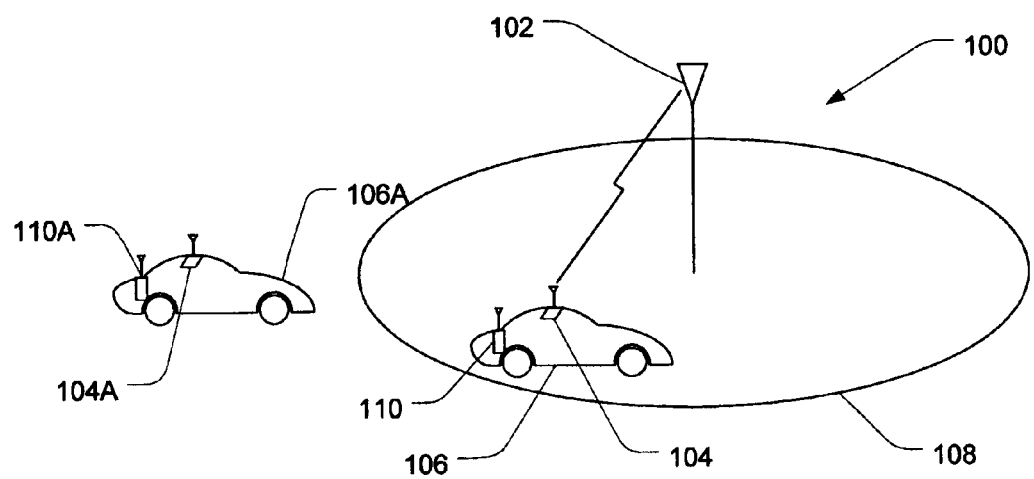
FIG. 1 illustrates a Road Transport and Traffic Telematics, Dedicated Short Range Communications system in which a device operating in accordance with the present invention can be operated.
Figure 2:
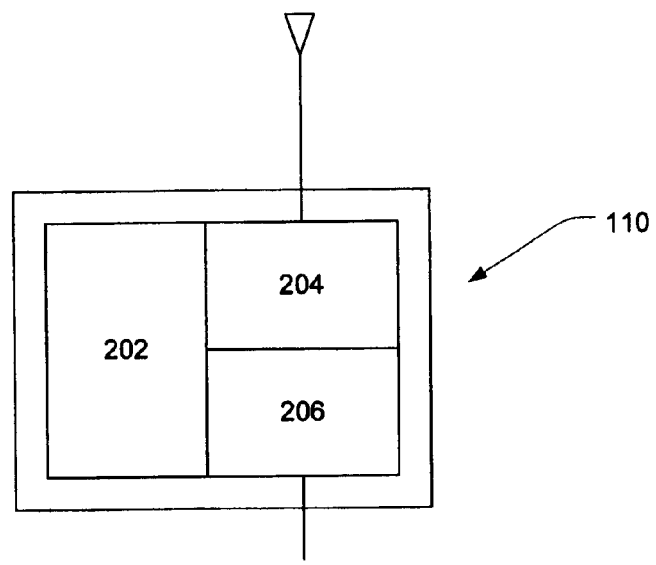
FIG. 2 illustrates a conventional Intelligent Transport Systems device.
Figure 3:
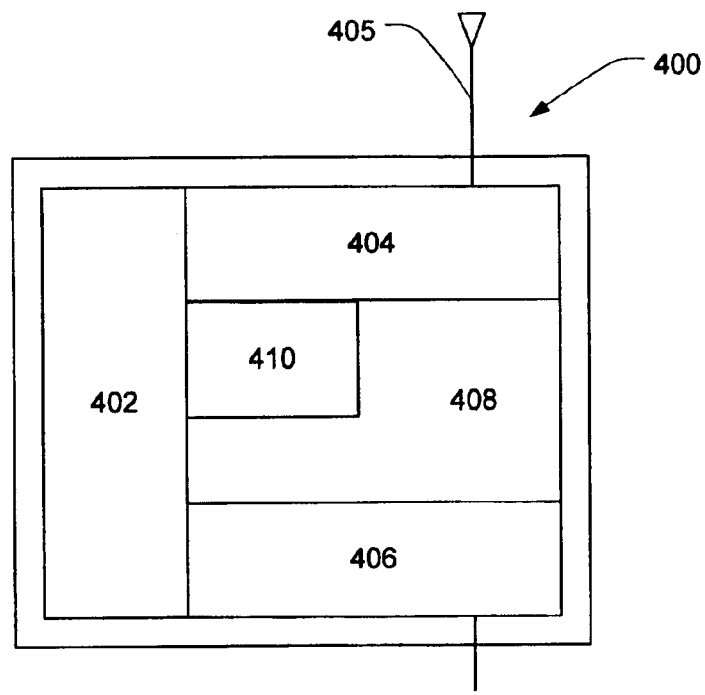
FIG. 3 illustrates an embodiment of an Intelligent Transport Systems transceiver made in accordance with the present invention.

FIG. 3 illustrates schematically, selected components of an ITS transceiver 400. In particular the receiver components of the transceiver are illustrated. The ITS device 400 includes an ITS receiver component 404 adapted to receive a radio signal via antenna 405 and output a demodulated signal to an ITS baseband processor 408. Higher level processing of the demodulated signals is performed by according to the protocol stack 406.

The transceiver 400 also includes a detector 410 configured to analyse the signals received by the receiver 404 and determine whether or not the received signal includes transmission on a predetermined non-ITS channel—namely a channel associated with an RTTT-DSRC system.

The controller also includes a controller 402. The controller 402 is responsible for scheduling the use of the radio resources of the device 400 between the competing RTTT-DSRC detector 410 and ITS Radio functions. In the event that the channel detector 410 detects a RTTT-DSRC signal, the controller 402 prevents transmission of potentially interfering ITS signals.

The controller 402 is configured to cause the receiver 404 to be tuned to the ITS frequency band and to decode the received channels according to the ITS access scheme, and also to cause the receiver to be tuned to the RTTT-DSRC frequency from time to time to enable the channel detector to attempt detection of a RTTT-DSRC transmission. In this way the sharing of ITS Radio resources between the RTTT-DSRC detection and ITS communications functions is achieved.

In time periods where the radio resources are allocated to receiving the RTT DSRC frequency the RTTT-DSRC detector 410 processes the received signal. During this period the ITS Baseband processor 406 may be unable to receive ITS signals, unless the transceiver is arranged to have multiple ITS receivers.

The RTTT-DSRC detector 410 informs the controller 402 if it determined that a RTTT-DSRC signal is present. The RTTT-DSRC detector 410 may be disabled while the ITS Radio RF 404 is tuned to ITS frequencies.

The RTTT-DSRC channel detector 410 is arranged to analyse a received signal to detect the presence of a RTTT-DSRC transmission without necessarily decoding the received signal. The RTTT-DSRC detector 410 may use several techniques to determine if a RTTT-DSRC signal is present, for example analysing the power and/or the transmission structure of a signal received in the RTTT-DSRC frequency band.

In one embodiment, the detector 410 analyses the received signal and if the power in the frequency band where RTTT-DSRC signals are transmitted is above a threshold level the RTTT-DSRC detector 410 determines that it is in a RTTT-DSRC zone. For example, the received signal can be analysed to determine the power level at selected frequency or over a frequency band. This power spectral density approach can be used to calculate the total RTTT-DSRC in-band signal power. This value can be compared to a threshold to decide if there is a RTTT-DSRC signal present.

In another embodiment, the detector 410 checks for the one or more predetermined signal or transmission structures that are expected to be used in RTTT-DSRC waveforms. For example, the preamble of a RTTT-DSRC signal can be transmitted using 2-level Amplitude Modulation at 500 or 250 kbps. If this signal structure is expected on the RTTT-DSRC frequency, the RTTT-DRSC detector 410 can include an element sensitive to this structure. For example the detector 410 can include a time domain correlator to detect the AM signal at the chosen frequency.

In a preferred embodiment, in addition to the reuse of the ITS Radio receiver 404 the RTTT-DSRC detector 410 also reuses elements of the ITS Radio Baseband processor 408 resources.

As will be appreciated, because the ITS and RTT DSRC are not synchronised with each other, the ITS device may switch into the RTTT-DSRC detection mode part way through a transmission on the RTTT-DSRC. In the case that the RTTT-DSRC detector 410 begins processing part way through a RTTT-DSRC message, Power Spectral Density techniques can be used to detect the presence of the RTTT-DSRC signal. The RTTT-DSRC detector 410 is able to use FFT or DFT resources from the ITS Radio baseband processor 408 to assist with these Power Spectral Density measurements.

In a preferred form, the controller 402 allocates the radio resources of the receiver according to a predefined scheme. In one form, the allocation scheme leverages the timing scheme used in ITS transmissions to provide an acceptable trade off between RTTT-DSRC detection speed and acceptable ITS signal reception.

In ITS two types of logical channels are commonly defined. One or more service channels (SCH) and a control channel (CCH). The CCH is used for critical safety services whereas the SCH is used for other services such as traffic probe snapshots. More specifically, in the SAE J2735, IEEE 1609/802.11p family of standards Basic Safety Messages are broadcast on the CCH several time per second from each vehicle. All vehicles within range can then receive this broadcast message and obtain the position of the transmitter from the message payload. In a single radio system, the ITS radio resources are tuned some of the time to the CCH frequency and some of the time to an SCH. In devices with multiple radios it is possible to operate on both CCH and SCH channels simultaneously.

Figure 4:
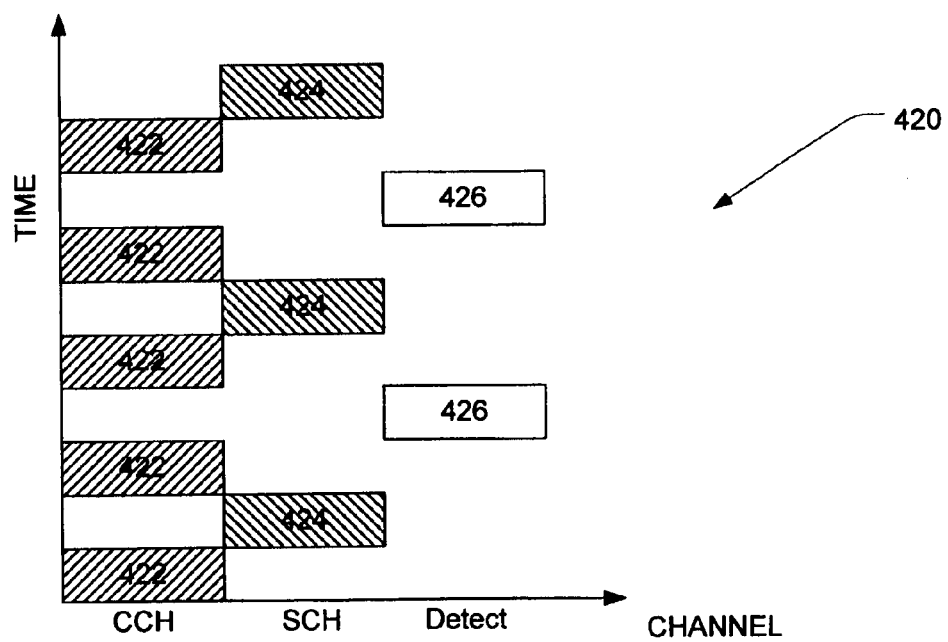
FIG. 4 is a diagram illustrating the time periods in which an Intelligent Transport Systems, made in accordance with an embodiment of the present invention, receives an ITS service channel and time periods in which it attempts to detect RTTT-DSRC communications.

In a preferred scheme, the controller 402 causes a receiver 404 of the device 400 to tune to the RTTT-DSRC frequency band in a time period where that receiver would normally communicate on the SCH. During this time the RTTT-DSRC detector 410 can determine the presence transmissions of any RTTT-DSRC devices. The RTTT-DSRC detection phase could also be executed on the CCH, but this is less preferable since the SCH is typically used for lower priority transmissions in the ITS. FIG. 4 illustrates an example of a timing scheme, 420, for the reception of signals in a single receiver ITS device, such as that of FIG. 3. In this scheme:

the time periods 422 indicate periods in which a first logical channel (e.g. the CCH can be received);

the time periods 424 indicate periods in which a second logical channel (e.g. the SCH can be received); and the time periods 426 indicate periods in which the receiver can be tuned to another frequency band so the channel detector 410 can scan for transmissions.

As can be seen, radio resources are preferentially assigned to the first logical channel and less priority given to the second logical channel and the task of scanning for transmissions on the other frequency band (e.g. the RTTT-DSRC frequency). The relative time allocated to the three reception tasks and the timing of them can be varied from this example, as needed. Moreover, in an ITS with multiple logical channels, it could be decided that the ITS device will not use one of the logical channels and instead additional time allocation is granted to the detection task. In this case, no time periods are be allocated to reception on the excluded logical channel.

In the case that the ITS device has two ITS radio receivers, such as that contemplated in draft ETSI ITS standards, the CCH is assigned to one radio while SCH communications assigned to the other Radio. In this case, the RTTT-DSRC detection can be scheduled on either or both of the SCH and CCH radios, however as noted above, the preference is to use the SCH of the ITS radio system as the applications are generally less critical on the SCH than the CCH.

Figure 5:
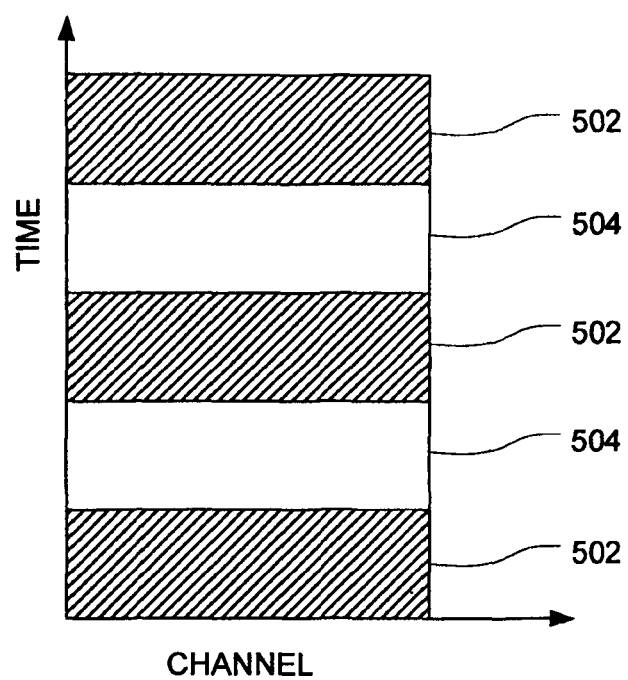
FIG. 5 is a diagram illustrating the time periods in which an Intelligent Transport Systems device, made in accordance with another embodiment of the present invention, receives an ITS service channel and time periods in which it attempts to detect RTTT-DSRC communications.

FIG. 5 illustrates an example of such a timing where one radio receiver is assigned to the one of the ITS logical channels and periodically used to scan the RTTT-DSRC. The diagram illustrates, the allocation of radio resources of one receiver of the ITS device between an ITS channel (preferably a SCH logical channel) and RTTT-DSRC frequency band. (e.g. this may be one radio of a two-radio ITS device, the sole radio in an ITS device where only one ITS logical channel exists, or where only one ITS logical channel is to be monitored.)

In the diagram 500 the time periods 502 represent time periods in which the radio resources are assigned to the ITS logical channel and time periods 504 in which the resources are assigned to an RTTT-DSRC frequency band and during which the detector 410 attempts to detect RTTT-DSRC communications. The timing of the switching from ITS communications mode to RTTT-DSRC mode can be periodic as illustrated in FIG. 4, random or varied according to any known scheme. The other receiver could be permanently assigned by the controller 402 to another ITS channel, and thus is not illustrated.

The underlying purpose of the detection of the RTTT-DSRC system is to minimize or avoid interference between the ITS and RTTT-DSRC. Avoidance of interference can be achieved by the controller 402 totally preventing transmission by a transmitter of the device 400. Alternatively, it may be possible to transmit at certain frequencies without unacceptable interference, in this case the controller 402 can restrict transmission to selected frequency bands fulfilling non-interference requirements, or by preventing transmission by the device in one or more frequency bands that are likely to cause interference. In another form, the controller 402 can cause a transmitter of the ITS device to operate at a reduced power level that will not cause unacceptable levels of interference.

Once the detector 410 has detected the presence of an RTTT-DSRC transmitter and the controller has put the transceiver into a mode that minimizes or eliminates interference from the ITS transmissions, it will be necessary to return to a mode in which normal ITS transmission can be performed. This can be performed in a number of ways, for example the controller 402 can revert to normal ITS communications after a predefined time has elapsed. If the ITS device is position-aware (e.g. is has a receiver for determining its position by a satellite positioning system) the controller 402 can revert to normal transmission on the ITS device once the transceiver has moved a predefined distance. Alternatively the controller 402 can be configured to allocate the radio resources to the RTTT-DSRC channel, and stay in its detection mode until the RTTT-DSRC detector 410 no longer detects transmission on the RTTT-DSRC frequency. The ongoing analysis of the RTTT-DSRC frequency can be continuous or performed periodically. Once the applied criterion is met the controller 402 will allocate radio resources in the normal manner and normal ITS communications can be resumed.

It will be understood that the invention disclosed and defined in this specification extends to all alternative combinations of two or more of the individual features mentioned or evident from the text or drawings. All of these different combinations constitute various alternative aspects of the invention.

The invention claimed is:

1. An Intelligent Transportation Systems (ITS) device including:

radio resources including a receiver adapted to receive a radio signal in at least two frequency bands;

a channel detector arranged to analyse a signal received in a first frequency band to determine the presence of a transmission in that frequency band; and a controller configured to control assignment of radio resources, and in the event that the channel detector detects a signal in the first frequency band, to prevent transmission of a potentially interfering radio signal, wherein the controller is configured to cause the receiver to be tuned to a second frequency band and to decode a plurality of received channels transmitted on the second frequency band, according to a predetermined access scheme applied to transmissions on the second frequency band, and wherein in the event that the predetermined access scheme applied to transmission on the second frequency band assigns a first transmission of a first type to a first logical channel, and a second transmission of a second type to a second logical channel, the controller is configured to assign radio resources to the first frequency during at least some periods in which a transmission on the second logical channel of the second frequency band could be received.

2. The ITS device as claimed in claim 1 wherein the controller is configured to cause the receiver to be tuned to the first frequency from time to time to enable the channel detector to attempt detection of a transmission in the first frequency band.

3. The ITS device as claimed in claim 2 wherein the predetermined access scheme includes a plurality of second logical channels and the controller is configured to assign radio resources to the first frequency during at least some periods in which a transmission on one of the second logical channels of the second frequency band could be received.

4. The ITS device as claimed in claim 1 wherein the channel detector is arranged to analyse a received signal to detect the presence of a transmission in the first frequency band without decoding the received signal in the first frequency band.

5. The ITS device as claimed in claim 1 wherein the channel detector is arranged to analyse a power level of a received signal in the first frequency band, and in the event that the received power level is above a threshold, determine that a transmission in the first frequency band is detected.

6. The ITS device as claimed in claim 5 wherein the channel detector includes a spectral analyser to determine a power level at at least one frequency in the first frequency band.

7. The ITS device as claimed in claim 1 wherein the channel detector is arranged to detect a predetermined transmission structure in the first frequency band.

8. The ITS device as claimed in claim 1 wherein the channel detector is arranged to detect a predetermined modulation scheme in the first frequency band.

9. The ITS device as claimed in claim 8 wherein the channel detector includes a time domain correlator for detecting the modulation scheme in the first frequency band.

10. The ITS device as claimed in claim 1 which includes shared radio resources that are used for reception of signals on the first and second frequency bands.

11. A method in a transceiver operating in an Intelligent Transportation System (ITS), the method including:
enabling reception of a radio transmission in at least one ITS frequency band;
enabling reception of a radio transmission in at least one first non-ITS frequency band;
analysing a signal received in the first non-ITS frequency band to detect the presence of a transmission in that frequency band; and in the event that a signal in the first non-ITS frequency band is detected; and
preventing transmission of a potentially interfering radio signal, by the transceiver,
wherein the transmissions received on the ITS frequency band are arranged according a predetermined access scheme applied, such that the ITS frequency band includes a first logical channel and second logical channel, and wherein the method includes:
enabling reception of a radio transmission in at least one of the first non-ITS frequency band during at least some periods in which a transmission on the second logical channel could be received.

12. The method as claimed in claim 11, wherein the step of enabling reception of a radio transmission in at least one ITS frequency band includes tuning a receiver of the transceiver to the ITS frequency band; and the step of enabling reception of a radio transmission in at least one first non-ITS frequency band includes tuning the same receiver to the non-ITS frequency band.

13. The method as claimed in claim 11 wherein the access scheme includes a plurality of second logical channels, and wherein the method includes enabling reception of a radio transmission in the first non-ITS frequency band during at least some periods in which a transmission on one of the second logical channels could be received.

14. The method as claimed in claim 11 which includes analysing a received signal in the non-ITS channel to detect the presence of a transmission without decoding the received signal.

15. The method as claimed in claim 11 wherein the step of analysing a signal received in the first non-ITS frequency band to detect the presence of a transmission in that frequency band, includes:
analysing a power level of a received signal in the non-ITS frequency band; and
in the event that the received power level is above a threshold, determining that a transmission in the non-ITS frequency band is detected.

16. The method as claimed in claim 11 wherein the step of analysing a signal received in the first non-ITS frequency band to detect the presence of a transmission in that frequency band, includes:
analysing the received signal to detect a presence or absence of a predetermined transmission structure in the received signal.

17. The method as claimed claim 16 wherein the predetermined transmission structure includes a predetermined modulation scheme.

18. The method as claimed in claim 17 wherein the method includes:
conducting time domain correlation to detecting a modulation scheme in the received signal.

19. The method as claimed in claim 11 wherein the method includes:
conducting spectral analysis of the received signal to determine a power level at one or more frequencies in the non-ITS frequency band.

20. The method as claimed in claim 11 wherein the step of preventing transmission of a potentially interfering radio signal, by the transceiver includes any one or more of the following:
preventing transmission by the device;
preventing transmission by the device in one or more selected frequency bands;
preventing transmission by the device having a power level above a predetermined power level.

21. The method as claimed in claim 11 which further includes:
ceasing prohibition of transmissions of a potentially interfering radio signal.

22. The method as claimed in claim 21 wherein the step of ceasing prohibition of transmissions of a potentially interfering radio signal occurs after any one or more of the following criterion are fulfilled:
a predefined time has elapsed;
the transceiver has moved a predefined distance;
a subsequent analysis of a signal received in the first non-ITS frequency band fails to detect the presence of a transmission in that frequency band.

* * * * *